United States Patent [19]

Dias

[11] Patent Number: 5,033,901
[45] Date of Patent: Jul. 23, 1991

[54] FASTENING SYSTEM FOR ANGLE PLATES

[76] Inventor: Sebastiao F. Dias, 1504 N. Kildare Ave., Apt. 1B, Chicago, Ill. 60651

[21] Appl. No.: 480,867

[22] Filed: Feb. 14, 1990

[30] Foreign Application Priority Data

Feb. 15, 1989 [BR] Brazil ............................ 6900238[U]

[51] Int. Cl.⁵ .............................................. F16B 7/04
[52] U.S. Cl. .................................. 403/172; 403/176; 403/403
[58] Field of Search .............. 403/403, 382, 205, 170, 403/172, 400, 388, 171, 176

[56] References Cited

U.S. PATENT DOCUMENTS

| 2,888,072 | 5/1959 | Nicholas | 403/172 X |
| 4,056,327 | 11/1977 | Daus, Jr. et al. | 403/172 |
| 4,347,015 | 8/1982 | Olashaw | 403/171 X |
| 4,589,792 | 5/1986 | Niziol | 403/403 X |
| 4,592,671 | 6/1986 | Daum | 403/171 |
| 4,621,879 | 11/1986 | Schneider | 403/403 X |
| 4,726,701 | 2/1988 | Thomas | 403/176 X |
| 4,782,637 | 11/1988 | Eriksson et al. | 403/176 X |

FOREIGN PATENT DOCUMENTS

2912945 10/1980 Fed. Rep. of Germany ...... 403/172

*Primary Examiner*—Peter M. Cuomo
*Attorney, Agent, or Firm*—Olson & Hierl

[57] ABSTRACT

The present invention relates to a fastening system for angle plates which include support arms to provide a more precise and reliable connection and attachment between the angle plates comprising an inner support member having two side walls defining an angle of about 90 degrees therebetween and two upper surfaces defining an angle with the side walls, each having an opening or bore cut therethrough; an outer support member having two side walls defining an angle of about 90 degrees therebetween, the inner support member and the outer support member having a threaded bore centrally cut therethrough; each angle plate having side walls and upper surfaces to position its support arms, each of the upper surfaces having an opening or bore cut therethrough to cooperate with the bores in the upper surfaces and with the support arms to firmly maintain the support arms in a stable position.

3 Claims, 3 Drawing Sheets

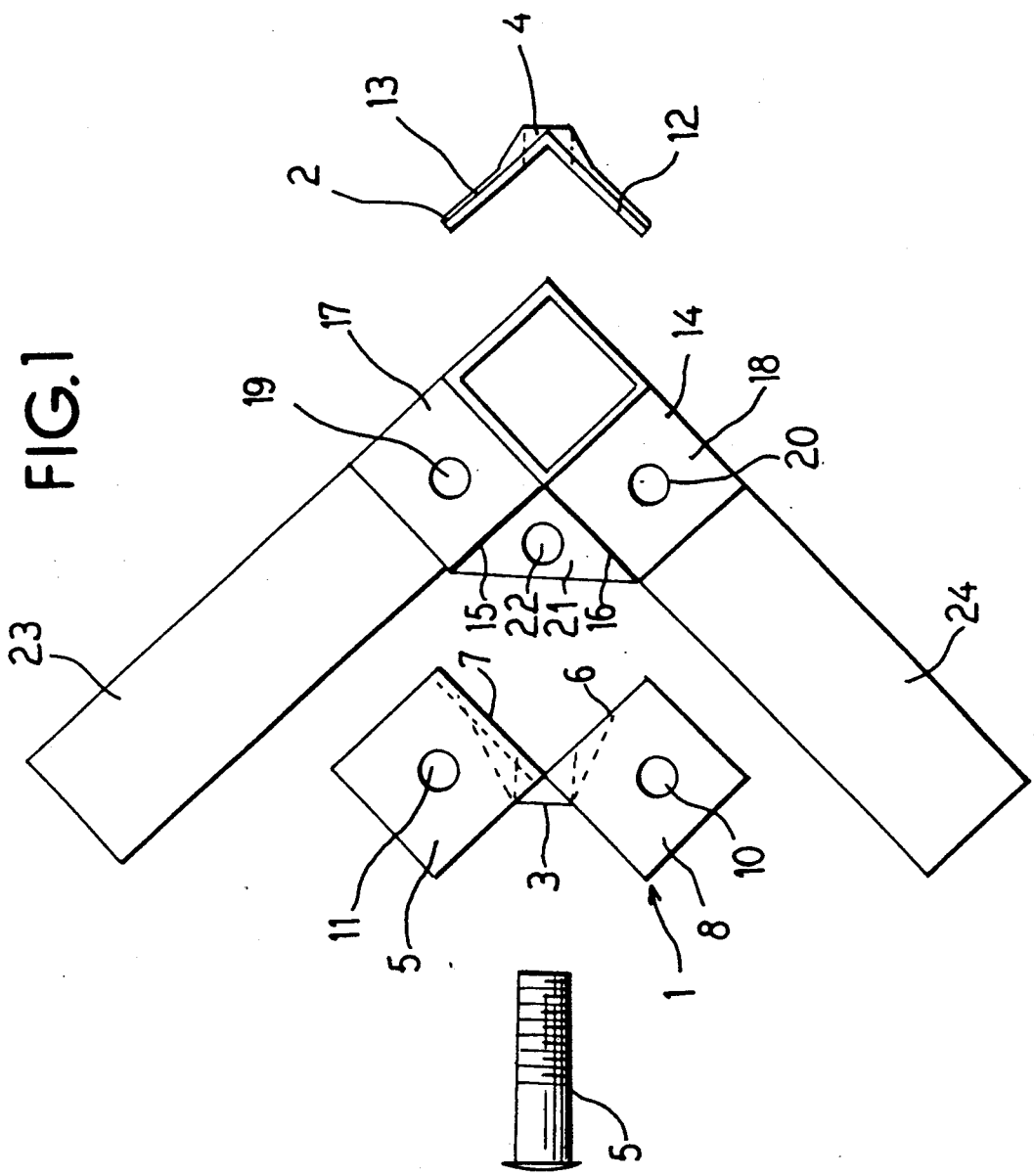

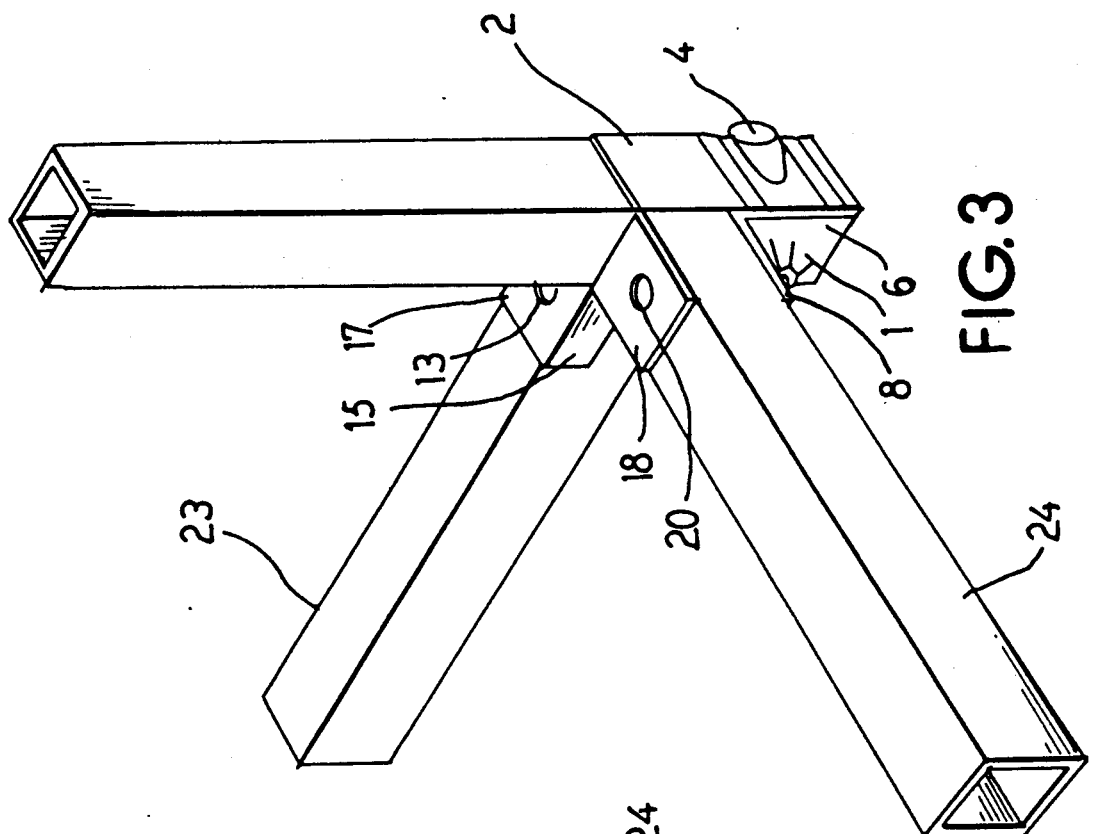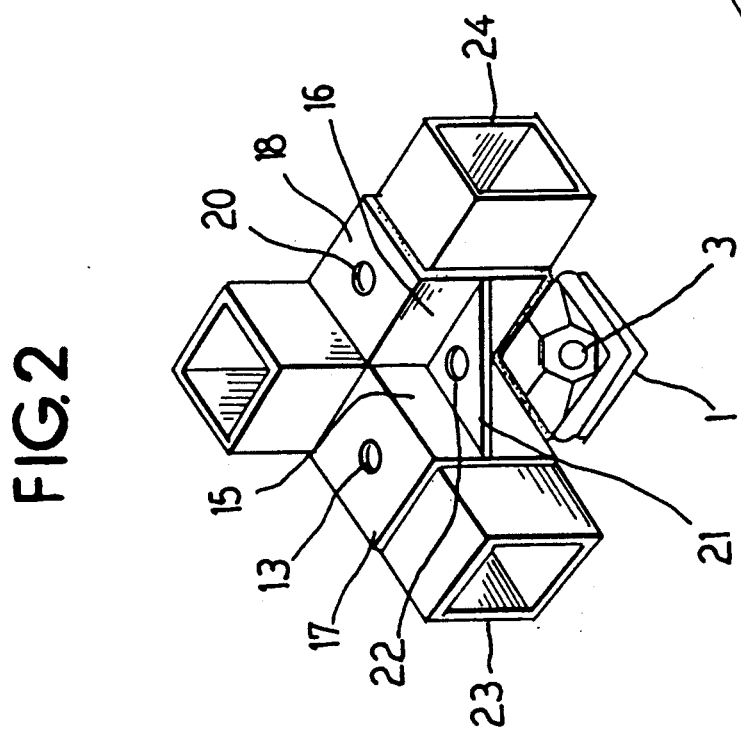

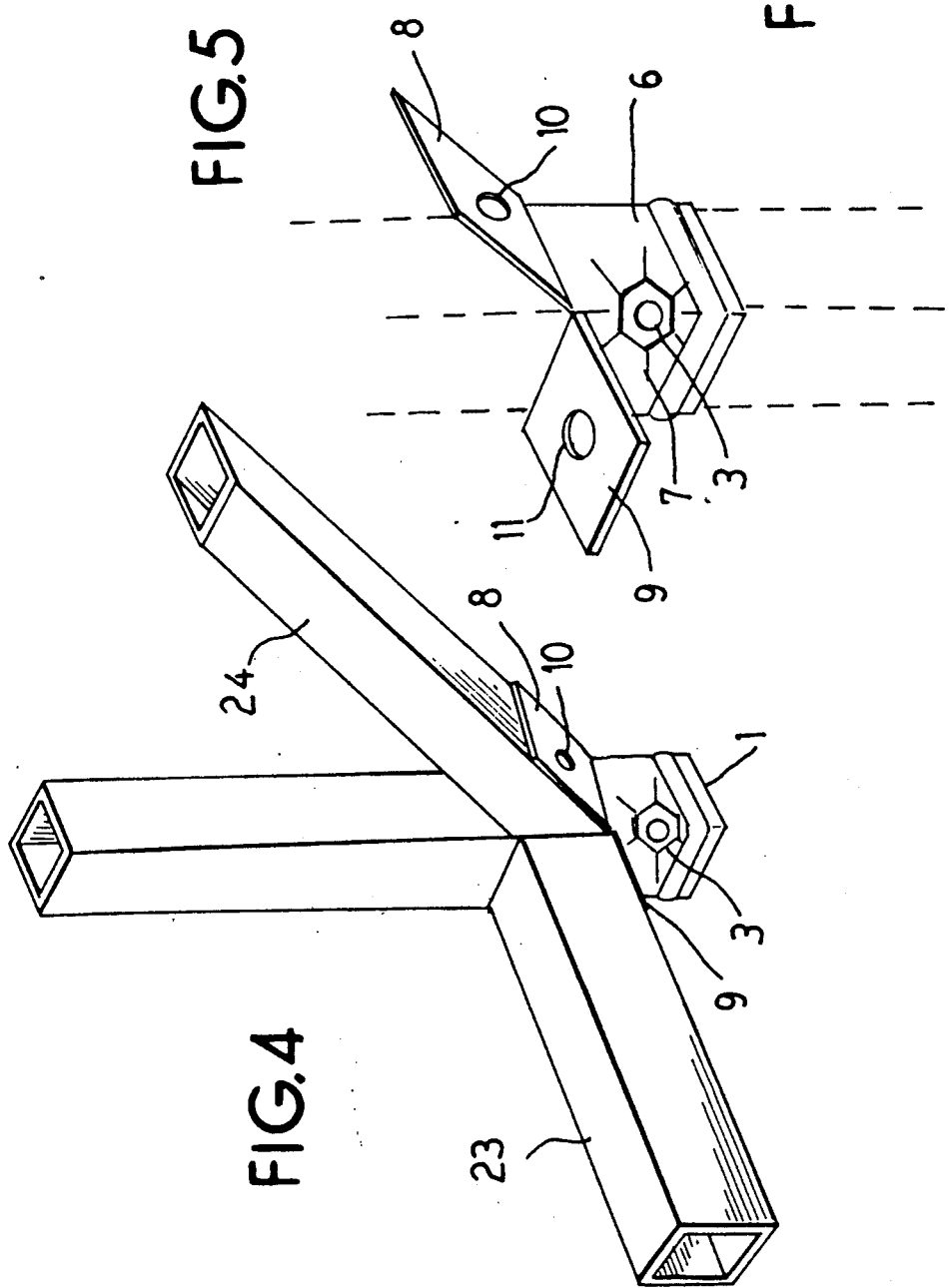

FASTENING SYSTEM FOR ANGLE PLATES

TECHNICAL FIELD

The present invention relates to angle plates and, in particular, to a fastening system for use with angle plates having straight, square or rectangular cross-sectioned support arms in order to provide a precise and reliable connection and attachment of the angle plates.

BACKGROUND OF THE INVENTION

Angle plates are usually connected and fastened by well-known means such as welding, screws, bolts and nuts, or by pressure and the like. All these methods, however, have disadvantages which hamper their use.

Welding, for example, apart from producing a connection which is difficult repair and maintain, has as its greatest drawback the fact that welded structures are usually heavy and bulky and, therefore, are difficult to transport from their place of manufacture to the site where they will be installed. The use of screws usually results in unstable and weak structures which tend to become crooked and unstable. Bolts and nuts are, in some cases, difficult to fasten because often one of them cannot be easily reached with a fastening tool. Finally, pressure-fit connecting elements are usually made from a rigid plastic material which breaks easily when subjected to heavy weights.

SUMMARY OF THE INVENTION

The fastening system for use with angle plates according to the present invention was conceived and designed to solve the drawbacks of the above-discussed fastening devices of the prior art so that a precise and reliable connection and attachment for the angle plates is provided. In addition, the fastening system according to the present invention allows mounting of the angle plates and support arms to form an upright structure in the field with the use of a single tool. This feature also simplifies the disassembly of the structure and the removal of one or more angle plates for repair or replacement.

The present invention and its features along with its other benefits and advantages can be better understood from the following description which should be considered in connection with the accompanying drawings.

BRIEF DESCRIPTION OF THE DRAWINGS

The present invention will now be described in greater detail with reference to a preferred embodiment, which should not be considered as a limitation thereof, shown in the attached drawings, wherein:

FIG. 1 is a partially exploded plan view of the present fastening system and an angle plate;

FIG. 2 is a perspective view of a fastened angle plate;

FIG. 3 is an additional perspective view of a fastened angle plate viewed from another angle;

FIG. 4 is a perspective view of a fastened angle plate showing a 45 degree connection and attachment in the shape of a wall support;

FIG. 5 is an additional perspective view of the 45 degree connection and attachment shown in FIG. 4; and FIG. 6 is a further perspective view of the 45 degree connection and attachment shown in FIGS. 4 and 5.

DESCRIPTION OF A PREFERRED EMBODIMENT

With particular reference to the drawings, a fastening system including a device for connecting angle plates according to the present invention comprises an inner support member 1 and an outer support member 2. Each member includes a contiguous, internally threaded bore 3 and 4, respectively, centrally cut therethrough which receives and cooperates with a fastening bolt 5.

The inner support member 1 is preferably stamp-formed from a single sheet of metal conformed to define two side walls 6 and 7 forming an angle of about 90 degrees therebetween. Each of the side walls includes an upper portion that is folded about 90 degrees outwardly to define two upper, planar, horizontal surfaces 8 and 9, and each side wall further includes a central bore 10 and 11, respectively, cut therethrough.

The outer support member 2 is also stamp-formed from a single sheet of metal conformed to define two side walls 12 and 13 which define an angle of about 90 degrees therebetween, with the contiguous threaded bore 4 being positioned along the folded edge therebetween.

As can be better seen from FIGS. 1, 2 and 3, an angle plate 14 comprises two side walls 15 and 16 which preferably define a 90 degree angle therebetween in which upper portions thereof are folded 90 degrees outwardly to define upper surfaces 17 and 18, each having a contiguous bore 19 and 20 centrally cut therethrough. The angle plate is also provided with a horizontal triangular surface 21 having a contiguous bore 22 centrally cut therethrough.

The inner support member 1 is connected to the angle plate 14 through its upper horizontal surfaces 8 and 9, which connect to support arms 23 and 24 and to the upper surfaces 17 and 18 through usual connecting means in order to position the inner support member 1 and the support arms 23 and 24. In addition to this connection, which can be easily made in the field, a single Allen screw is passed through threaded bores 3 and 4 in order to fasten the connection.

FIGS. 4, 5 and 6 show another embodiment of the fastening system according to the present invention in which one of the upper surfaces 8 of the inner support member 1 defines a 45 degree angle relative to a horizontal plane, whereby different orientations can be easily provided to satisfy the needs of any customer while at the same time providing more strength to the mounted structure.

Having described a preferred embodiment of the invention, it should be understood that additional modifications can be made without departing from its true spirit and scope as discussed herein and as defined in the attached claims.

What is claimed is:

1. An angle plate fastening system for interconnecting adjoining structural members to form a framework, said structural members having flat sides disposed at 90 degrees relative to one another, said system comprising:
   (a) a framework interiorly located first angle plate member comprised of:
      (1) two flattened side walls angularly generally disposed at 90 degrees relative to one another which are integrally interconnected along a common edge, and which have a first hole extending through said edge, and (2) a pair of flattened end walls, each one thereof angularly integrally extending from a different one of said side walls along a respective edge thereof which is adjacent said common edge, each said end wall having a first opening therein;

(b) a framework exteriorly located second angle plate member comprised of:

(1) two flattened side walls angularly generally disposed at 90 degrees relative to one another which are integrally interconnected along a common edge, and which have a second hole extending through said edge, (2) said second hole being alignable with said first hole when such a first structural member is disposed between said first and said second plate member, (c) screw means extendable into said first and said second hole when said holes are so aligned with each other and with a hole defined in such so disposed structural member for fastening said first and said second angle plate members together with said structural member therebetween;

(d) a framework interiorly located third angle plate member comprised of:

(1) two flattened side walls angularly generally disposed at 90 degrees relative to one another which are integrally interconnected along a common edge, and (2) a pair of flattened end walls, each one thereof angularly integrally extending from a different one of said side walls along a respective edge thereof which is adjacent said common edge, each said end wall having a second opening therein;

(3) said third angle plate member cooperating with said first angle plate member to position therebetween respective termini of a second and a third such structural member with said second opening being alignable with said first opening in each of said respective end walls when said respective second and third structural members as so positioned therebetween; and (e) fastening means extending through said first and said third openings when said holes are so aligned with each other and with said so positioned second and third structural members likewise having aligned holes therein for retaining said so positioned members in such assembled relationship.

2. The fastening system of claim 1 wherein, in each of said first and said third angle plate members, each one of said pair of end walls is disposed at 90 degrees relative to its respective said integral side wall.

3. A framework comprised of a fastening system of claim 1 with said first, second and third such structural members so fastened and so retained together therewith.

* * * * *